Nov. 7, 1933.   G. H. HART   1,933,801
THERMOSTATIC DEVICE
Filed Feb. 20, 1929

Inventor
George Hegeman Hart
By K. Clay Lindsey,
his Attorney

Patented Nov. 7, 1933

1,933,801

UNITED STATES PATENT OFFICE 1,933,801

THERMOSTATIC DEVICE

George Hegeman Hart, West Hartford, Conn.

Application February 20, 1929. Serial No. 341,382

6 Claims. (Cl. 73—118)

The present invention relates to a thermostatic device having a thermostatic element which, under heat changes, turns a shaft which carries an actuated member, such as a pointer, a switch arm, or both. In the embodiment of the invention herein illustrated, my improvements are shown as incorporated in a device having a switch which may be adjusted to throw the current on and off at predetermined temperatures, and also a coiled thermostatic member for controlling the switch and having indicating means, such as a pointer, for indicating the temperature of the apparatus which is to be controlled. It is to be understood, however, that the present invention is not limited to this one application.

An aim of the invention is to provide an improved arrangement wherein factors tending to result in inaccuracies in the controlling or indicating of the temperatures are, to a large extent, eliminated.

More particularly, an aim of the invention is to so construct and relatively arrange the parts that the thermostatically actuated shaft shall faithfully obey the torsional movement of the spiral thermostatic element which is directly responsive to temperature changes; variations and inaccuracies due to changes in friction between the parts or to side play or wobbling of the parts being substantially eliminated, so that the device will operate with great accuracy in the indications or control of the temperatures which affect the device. To these ends, the shaft (which carries the pointer or switch arm) is journaled near each end in a bearing, so that the shaft cannot wobble or move laterally; endwise movement of the shaft is prevented; and variations in the length of the thermostatic member have substantially no effect upon the shaft.

A still further object of the invention is to provide an improved casing construction for the switch mechanism which will admit of a novel manner of mounting, resulting in the preservation of the enamel on the casing against cracking, which is a common fault with the construction and method now employed for the securing of these enameled casings upon the base plates.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

With the foregoing and other objects in view, the invention will be more fully described, hereinafter, and will be more particularly pointed out in the claims appended hereto.

In the drawing, wherein like symbols refer to like or corresponding parts throughout the several views, Figure 1 is a side elevation of an improved thermostatic device constructed according to the invention.

Figure 2:
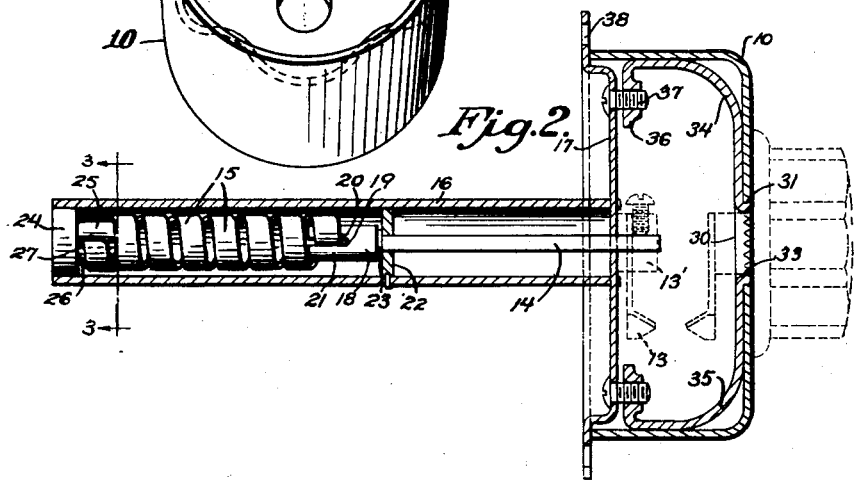
Figure 2 is a longitudinal section taken through the same.
Figure 3:
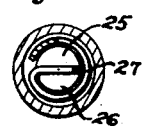
Figures 3 is a cross section taken on the line 3—3 in Figure 2.

Referring more particularly to the drawing, 10 designates the casing or cap, which is, by preference, of sheet metal having an exterior coating of enamel or the like. This casing houses the switch mechanism which is not shown in detail as the particular construction thereof forms no part of the present invention. The dial is shown at 11. The numeral 12 designates an angularly adjustable knob or handle which is adapted to be connected to an angularly adjustable switch unit, the latter not being shown. This switch unit may have the construction shown in the co-pending application of Gerald W. Hart, Serial No. 332,578, filed January 15, 1929. Fixed to, so as to rotate with, the knob 12 is a pointer 9, the end of which is bent rearwardly so as to overlie the dial or scale 11. The index or pointer 13 is also adapted to move over the dial 11, and such index or pointer, as shown in Figure 2, is fixed to the forward end of the shaft 14, which is adapted to be rotated by the spiral thermostatic member 15. The shaft 14 and thermostatic member 15 are housed within the perforated cylinder or barrel 16, projecting back from the casing and into the oven or other device, the temperature of which is to be indicated or controlled. This barrel 16 may be connected at its forward end to the base plate 17, or to any other appropriate part, and the base plate provides a bearing for the forward end portion of the shaft.

The rear portion of the shaft 14 has an attaching or anchor member or portion 18 for one end of the coiled thermostatic member 15. The anchor member is of cylindrical form, and is provided with a slot 19 and with forks or horns 20 and 21. The forward end convolution of the thermostatic member encircles the attached portion 18 in such maner that the thermostatic member has a free sliding bearing thereon while at the same time, loose lateral play between the shaft and the thermostatic member is avoided. The terminal end of the thermostatic member is turned inwardly on a diametrical line, and is slidably engaged in the slot 19. The relative dimensions of the slot 19 and the inturned end of the thermostatic element engaging therein, are such that this end will have a relatively free sliding movement in the slot 19 and yet there will be little or no turning movement between these parts.

In the rear end of the tube 16 is fitted an anchor plug 24, which is generally similar in construction and function to the anchor member 18. This plug may be tightly wedged into the tube so as to avoid its rotation therein, or it may be held against rotation in any other appropriate manner. The plug has a reduced cylindrical portion, which is transversely slotted so as to provide the spaced prongs 25 and 26, with a slot 27 therebetween. The rear end of the thermostatic element is turned inwardly and slidably engages in the slot 27 in the same manner that the forward end of the thermostatic member engages in the slot 19. Also the rear end convolution encircles the pin formed by the prongs 25 and 26 in such manner that this end convolution may slide longitudinally of the pin and yet be supported against excessive side play.

As previously stated, the forward end portion of the shaft has a bearing in a center opening in the base plate 17. Adjacent the anchor member 18 is a partition or disc 22 having an opening constituting a bearing for the rear end portion of the shaft 14. Thus opposite ends of the shaft are held against other than rotary movement. The shaft adjacent its rear end has a shoulder 23, which is adapted to abut against the partition 22 and secured on the forward end of the shaft is a collar 13' which abuts against the base plate 17, so that the shaft is held against end play. The pointer 13 is carried by the collar 13'.

Figure 1:
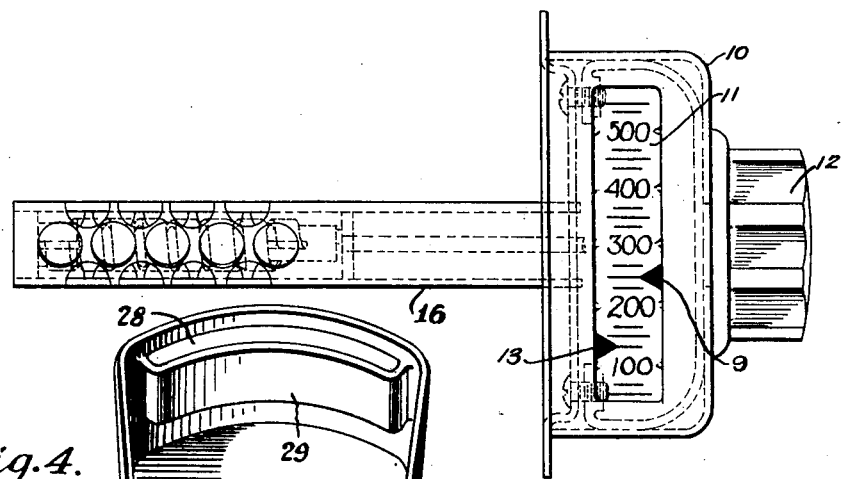
Figure 4:
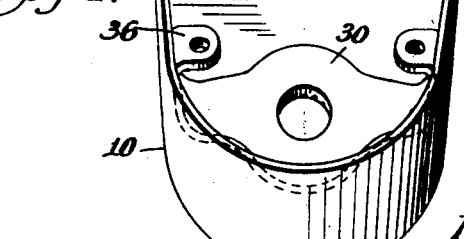
Figure 4 is a perspective view of the casing.

Now the casing 10, as shown in Figure 4, is provided with a slot 28 through which the figures on the dial may be observed, and the dial is preferably inscribed upon a depressed portion 29 of the casing wall, which is produced in the formation of the slot 28. Moreover, the casing 10 carries within it an attaching member 30 of sheet metal, preferably resilient sheet metal, or other appropriate material. The member is provided with an opening in its central portion to conform to the opening 31 made in the front wall of the casing 10 through which the stem of the knob 12 projects. The opening in the attaching member 30 may be produced in any manner, preferably attended by the formation of the out-turned flange 33, which is made to lie within the opening 31 and constitutes a lining therefor, and a bearing for the stem of the knob 12. The outer portion of the flange 33 may be peened over or operated upon in any appropriate way to form an interlock with the casing wall, whereby to hold the attaching member 30 securely in position. The attaching member is provided with the diametrically opposed arms 34 and 35, which lie along the front wall of the casing 10 and along the cylindrical wall of the casing, being curved across the corner portions.

The terminal ends of the arms are turned inwardly to provide lugs 36 having threaded openings therein to receive the screws or other fastenings 37 by which the attachment is made to the base plate 17, such base plate being preferably offset inwardly of the rear end of the casing 10. The base plate 17 is provided with openings 38 to receive fastenings by which the base plate is secured to the oven or to some other appropriate part.

In the use of the device, the switch unit is set by rotating the knob 12. The setting is indicated by the pointer 9. The barrel 16 being disposed in the oven and under the influence of the heat therein, the coiled thermostatic member will twist due to temperature changes within the oven and will in a well known manner rotate the shaft 14, causing a deflection of the pointer or index 13 over the scale 11 and resulting, in the opening and closing of the switch which controls the temperature in the oven, when such a switch is used.

Temperature changes in the oven produce a torsional movement in the spiral member 15, causing the member to rotate the shaft 14 and it is desirable to secure a transfer of this torsional movement to the index 13 without lost motion or variations in friction, and this is achieved by supporting the thermostatic element and the shaft in the manner described. The terminal ends of the member 15 are fitted on the anchors so that they may slide thereon but the fit is such as to avoid undesirable side play. The sliding movement of the terminal ends of the spiral member 15 in the slots is for the purpose of compensating for the necessary axial enlargement and shrinkage of the member 15 owing to rising and falling temperature. This axial movement in the member 15 is productive of a number of undesirable results, such for instance as compelling the shaft 14 to undergo end thrust in opposite directions, which disturbs the indication, introduces friction and sets up other results which reduce the degree of accuracy of the instrument, so that the instrument does not operate uniformly and consequently cannot be set with any assurance of accuracy by the operator. The presence of the bearings for the shaft will also prevent the shaft 14 from undergoing lateral vibration or moving longitudinally, from which the faithful and accurate operation of the indicating mechanism suffers. It will be noted that the shaft is supported in bearings near both its ends.

The casing 10, with its attaching plate 30 mounted therein may be simply moved up against the attaching plate 17, the screws 37 inserted and secured home, whereupon the attachment is made, without in any way causing the springing of the casing 10 into place, or the drawing up of the casing, as where screw ears were mounted on the casing. These former methods were frequently attended by a cracking of the enamel of the casing, so that the device lost its new and fresh appearance and became unsightly. The arms 34 and 35 may possess sufficient resiliency to take up any spring action required without imparting any distortion to the casing 10. It will be noted also that the rim of the casing entirely conceals the fastenings 37 and the joint between the parts and that an extremely neat and attractive appearance is presented.

It is obvious that various changes and modifications may be made in the details of construction and design of the above specifically described embodiment of this invention without departing from the spirit thereof, such changes and modifications being restricted only by the scope of the following claims:—

I claim as my invention:

1. An improved thermostatic device having an arm, a shaft on which said arm is fixed and having a slotted portion, and a spiral thermostatic member having an end engaging in the slotted portion of the shaft and axially slidable in such slotted portion of the shaft on axial expansion and contraction of said member, but locking the member and shaft together for rotary movement.

2. An improved thermostatic device having a pointer, a shaft carrying said pointer and having a cylindrical end portion provided with an axially elongated slot, and a spiral thermostatic member having one or more convolutions encircling said end portion provided with a terminal end portion disposed in the slot and slidable axially therein.

3. An improved thermostatic device having a pointer, a shaft carrying said pointer and having a cylindrical end portion provided with a diametrical slot, an anchor member disposed in spaced and opposed relation to said cylindrical end portion and having a cylindrical portion provided with a diametrical slot, and a spiral thermostatic member having its end convolutions respectively encircling said cylindrical portions and provided with terminal ends respectively sliding in said slots.

4. An improved thermostatic device comprising a casing having a dial, a barrel extending from said casing, a shaft journaled in said barrel and casing, a pointer on the forward end of said shaft and cooperating with said dial, the rear end of said shaft having a cylindrical portion provided with a transverse slot, an anchor member fixed in the rear end of said barrel and having a cylindrical portion provided with a transverse slot, and a spiral thermostatic member the opposite ends of which respectively encircle the cylindrical portions of said shaft and anchor member, said thermostatic member having terminal ends respectively engaged for sliding movement in said slots.

5. An improved thermostatic device comprising a casing having a dial, a pointer deflectible over said dial, a barrel extending substantially axially of said casing, a shaft for the pointer mounted at one end portion in a bearing in said casing, a partition in said barrel providing a bearing for the other end portion of said shaft, a thermostatic member in the barrel in operative relation to said shaft for angularly moving the same, and shoulders on said shaft respectively engaging said casing and partition for holding the shaft against endwise movement.

6. An improved thermostatic member having a shaft, supporting means for said shaft and comprising a pair of bearings in which the opposite ends of said shaft are journaled, means for preventing endwise movement of said shaft, an arm on one end of said shaft, the other end of said shaft having a cylindrical transversely slotted portion, and a spiral thermostatic member having one end encircling said cylindrical portion and provided with a terminal end slidably engaging in said slot.

GEORGE HEGEMAN HART.